(12) United States Patent
Lin

(10) Patent No.: US 6,554,290 B2
(45) Date of Patent: Apr. 29, 2003

(54) TOOL STRUCTURE FOR CLAMPING A TOOL HEAD QUICKLY

(76) Inventor: Kun-Tan Lin, No. 27, Yungyi 7th St., Taiping City, Taichung (TW)

( * ) Notice: Subject to any disclaimer, the term of this patent is extended or adjusted under 35 U.S.C. 154(b) by 0 days.

(21) Appl. No.: 09/968,965

(22) Filed: Oct. 3, 2001

(65) Prior Publication Data

US 2003/0062695 A1 Apr. 3, 2003

(51) Int. Cl.[7] .................. B23B 31/107; B23B 31/22
(52) U.S. Cl. ....................... 279/72; 279/75; 279/81; 279/82; 279/904
(58) Field of Search ........................... 279/72, 904, 905, 279/71, 74, 75, 81, 82, 22, 29, 30; 403/322.1, 322.2, 325, DIG. 6

(56) References Cited

U.S. PATENT DOCUMENTS

| | | | | |
|---|---|---|---|---|
| 1,432,225 A | * | 10/1922 | Wolnick et al. ............... | 279/72 |
| 2,571,621 A | * | 10/1951 | Saunders ...................... | 279/72 |
| 4,626,146 A | * | 12/1986 | Neumaier ...................... | 279/81 |
| 4,691,929 A | * | 9/1987 | Neumaier et al. ............ | 279/81 |

* cited by examiner

Primary Examiner—Steven C. Bishop
(74) Attorney, Agent, or Firm—Rosenberg, Klein & Lee

(57) ABSTRACT

A tool structure includes a tool having a rotation shaft formed with a central hole for insertion of the distal end of a tool. The rotation shaft is provided with a cover, and has an outer wall mounted with an elastic member and a drive member. A drive shaft is passed through a first guide slot of the rotation shaft and a second guide slot of the shaft seat in the rotation shaft. Multiple clamping shafts are mounted in the shaft seat to mate with a clamping recess formed in the rotation shaft. Thus, when the tool head is rotated by the rotation shaft, the tool head may be fixed rigidly and stably by the relative urging effect between the clamping recess and the clamping shafts during rotation of the rotation shaft.

7 Claims, 7 Drawing Sheets

TOOL STRUCTURE FOR CLAMPING A TOOL HEAD QUICKLY

BACKGROUND OF THE INVENTION

1. Field of the Invention

The present invention relates to a tool structure for clamping a tool head quickly.

2. Description of the Related Art

A conventional motorized tool 10 in accordance with the prior art shown in FIG. 7 comprises a rotation shaft 11 having a center formed with a central hole 12 so that the distal end of a tool head 20 may be inserted into the central hole 12. The end of the rotation shaft 11 is provided with a pawl-shaped clamping portion 13 mating with an outer screw portion 14, and an urging cover 30 is screwed on the screw portion 14 to urge the tool head 20 in the clamping portion 13. However, the clamping effect of the clamping portion 13 on the tool head 20 is not large enough.

SUMMARY OF THE INVENTION

The primary objective of the present invention is to provide a tool structure for clamping a tool head quickly, wherein the tool head may be mounted on and removed from the shaft seat of the tool structure rapidly and conveniently by moving the drive member directly without having to use an additional tool, thereby greatly enhancing the versatility and convenience of the tool structure.

Another objective of the present invention is to provide a tool structure for clamping a tool head quickly, wherein when the tool head is rotated by the rotation shaft, the tool head may be fixed rigidly and stably by the relative urging effect between the clamping recess and the clamping shafts during rotation of the rotation shaft.

In accordance with the present invention, there is provided a tool structure for clamping a tool head quickly, comprising: a tool having a rotation shaft having a center formed with a central hole so that a distal end of a tool head may be inserted into the central hole, wherein:

the rotation shaft has a top provided with a cover, and has an outer wall mounted with an elastic member and a drive member, and the drive member is urged by the elastic member, a drive shaft is fixed in the drive member and in turn extended through the rotation shaft and a shaft seat, the rotation shaft is provided with a first guide slot for passage of the drive shaft, and the shaft seat is provided with a second guide slot for passage of the drive shaft, the second guide slot has an slope different from that of the first guide slot, such that the rotation shaft and the shaft seat have different opposite positions when the drive member and the drive shaft are operated, multiple clamping shafts are mounted in the shaft seat to mate with a clamping recess formed in the rotation shaft.

Further benefits and advantages of the present invention will become apparent after a careful reading of the detailed description with appropriate reference to the accompanying drawings.

DETAILED DESCRIPTION OF THE INVENTION

Figure 1:
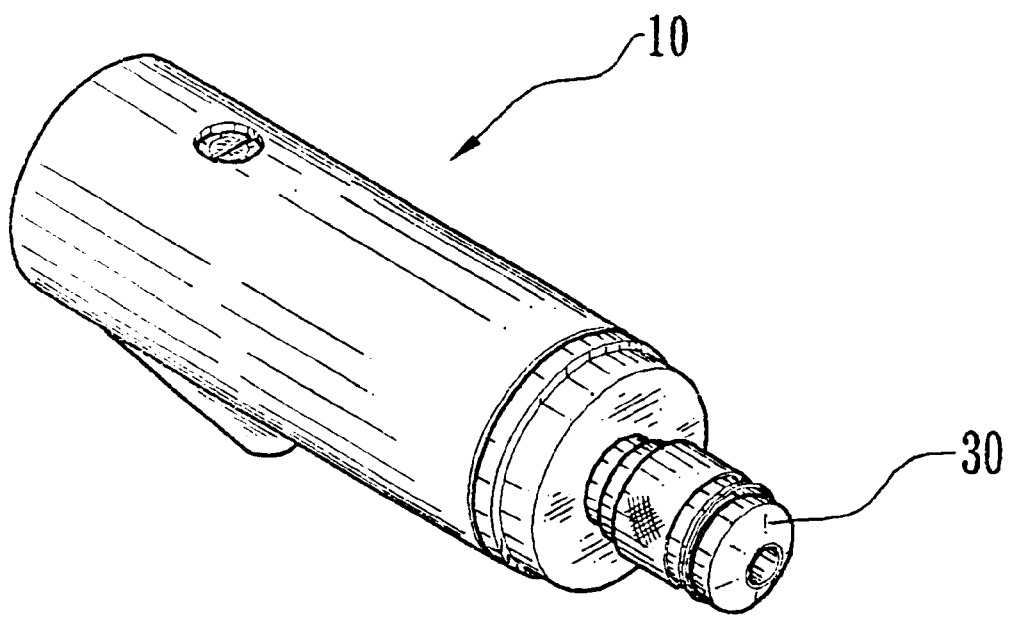
FIG. 1 is a perspective view of a tool structure for clamping a tool head quickly in accordance with the preferred embodiment of the present invention.

Referring to the drawings and initially to FIGS. 1–4, a tool structure for clamping a tool head quickly in accordance with the present invention comprises a pneumatically or electrically driven motorized tool 10 having a rotation shaft 11 having a center formed with a central hole 12 so that the distal end of a tool head 20 may be inserted into the central hole 12.

The rotation shaft 11 has a top end provided with an engaging portion 11 formed with an outer thread, and a cover 30 is formed with an inner thread screwed on the outer thread of the engaging portion 11 of the rotation shaft 11, for securing the cover 30 on the rotation shaft 11. The cover 30 has a center formed with a through hole 31 for passage of the tool head 20.

An elastic member 40 and a drive member 50 are serially mounted on the rotation shaft 11 respectively. A shaft seat 70 is mounted in the rotation shaft 11. A drive shaft 60 is in turn extended through the drive member 50, the rotation shaft 11, and through the shaft seat 70 in the rotation shaft 11, so as to co-operate with each other. Multiple clamping shafts 80 are mounted on the shaft seat 70, to mate with an opposite structure of the rotation shaft 11, so that the distance between the clamping shafts 80 may be changed actually, thereby achieving the purpose of clamping or loosening the tool head 20.

The elastic member 40 is mounted between the rotation shaft 11 and the drive member 50, and has a first end urged on an annular flange 110 that is formed on and protruded outward from the outer wall of the rotation shaft 11, and a second end urged on the inner wall of the drive member 50, so that the drive member 50 may be forced toward the cover 30.

The drive member 50 is formed with a fixing hole 51 having an inner thread. The drive shaft 60 is formed with a fixing portion 61 having an outer thread screwed into the fixing hole 51 of the drive member 50. The drive shaft 60 is formed with a smooth guide portion 62 having an outer diameter slightly smaller than that of the fixing portion 61. The guide portion 62 may be in turn extended through the rotation shaft 11 and the shaft seat 70. The wall of the rotation shaft 11 is formed with an oblique guide slot 112, and the shaft seat 70 is formed with a straight guide slot 71 aligned with the oblique guide slot 112. Thus, when the drive member 50 drives the drive shaft 60 to move upward and downward, the guide portion 62 of the drive shaft 60 may slide in the oblique guide slot 112 and the straight guide slot 71, so that the relative position of the rotation shaft 11 and the shaft seat 70 may be changed. A seal ring 52 is mounted on the outer wall of the drive member 50 for sealing and limiting the drive shaft 60.

The shaft seat 70 is provided with multiple recessed positioning portions 72 for receiving multiple cylindrical clamping shafts 80. The rotation shaft 11 is formed with a semi-arcuate clamping recess 113 to mate with the clamping shafts 80. When the relative position of the rotation shaft 11 and the shaft seat 70 is changed, each of the clamping shafts 80 may be respectively moved to the shallower position or deeper position of the clamping recess 113, thereby clamping or loosening the tool head 20 in the clamping shafts 80. In addition, when the tool head 20 is rotated by the rotation shaft 11, the tool head 20 may be fixed rigidly and stably by the relative urging effect between the clamping recess 113 and the clamping shafts 80 during rotation of the rotation shaft 11. The shaft seat 70 has a center provided with a central hole 73 for passage of the tool head 20.

Figure 2:
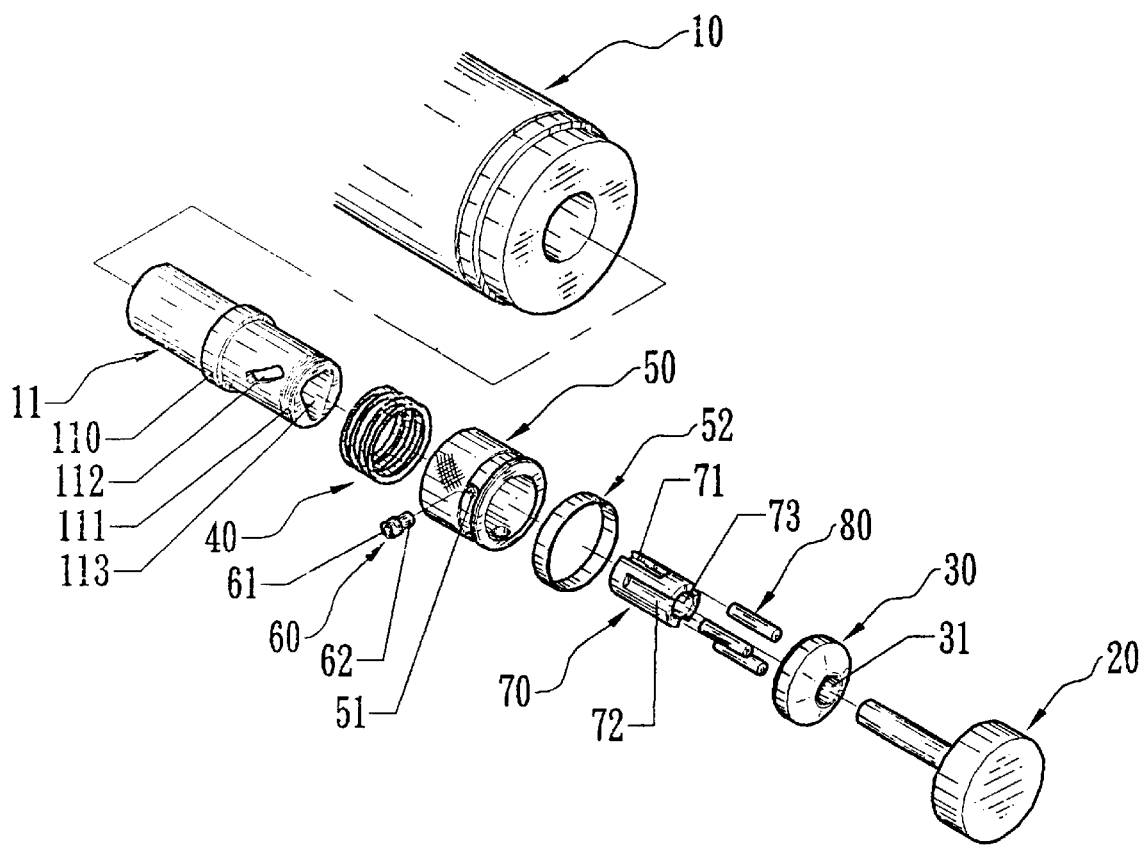
FIG. 2 is an exploded perspective view of the tool structure for clamping a tool head quickly as shown in FIG. 1.
Figure 3:
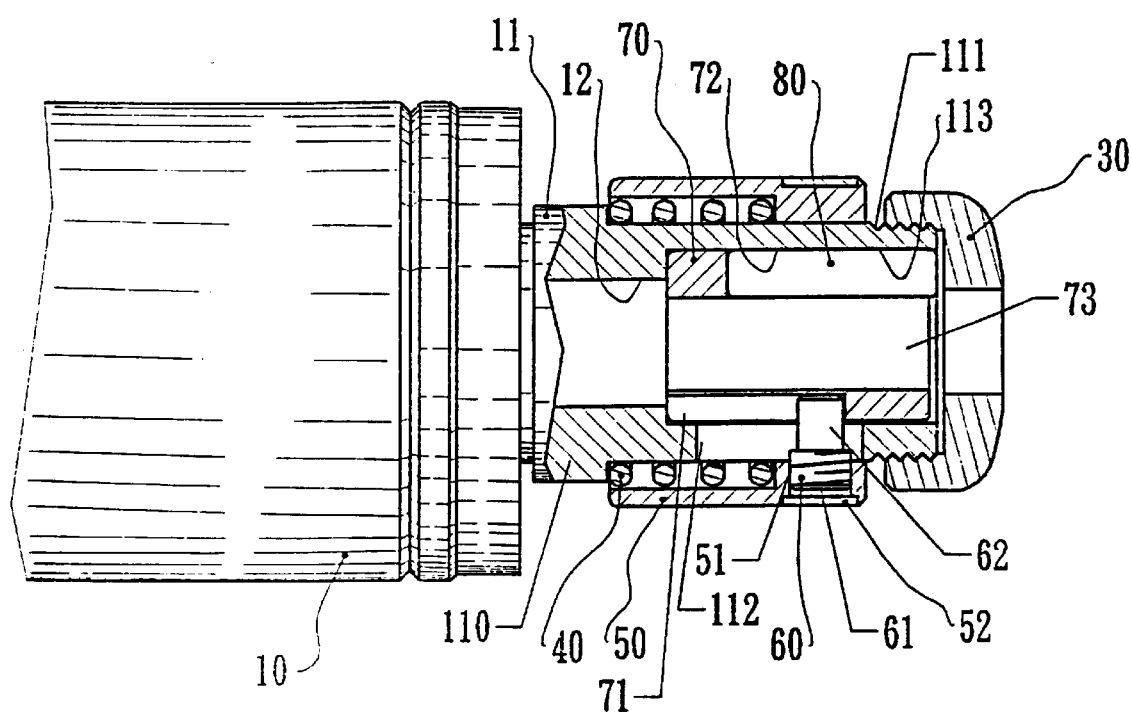
FIG. 3 is a side plan cross-sectional view of the tool structure for clamping a tool head quickly as shown in FIG. 1.
Figure 4:
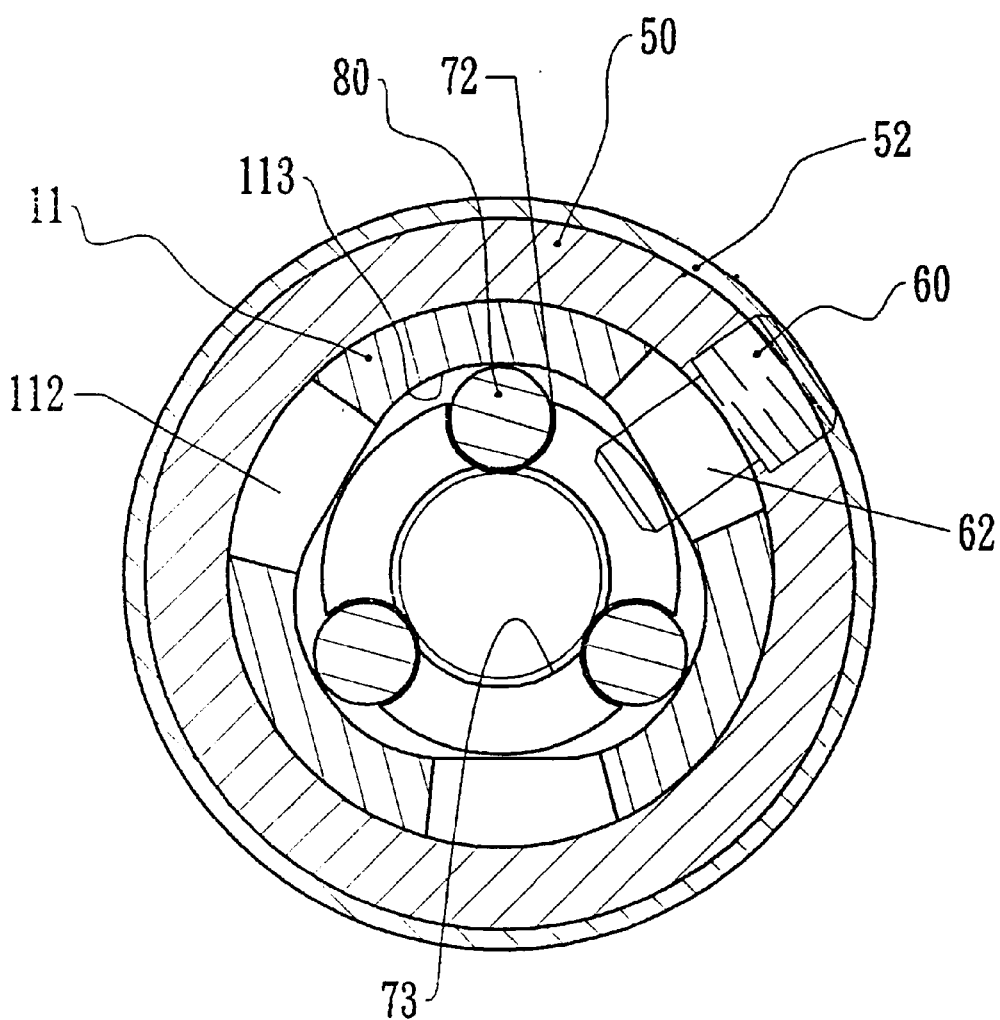
FIG. 4 is a front plan cross-sectional view of the tool structure for clamping a tool head quickly as shown in FIG. 1.

In operation, referring to FIGS. 3–6 with reference to FIGS. 1 and 2, the drive member 50 and the drive shaft 60 are forced by the elastic member 40 to the position as shown in FIG. 3, so that the shaft seat 70 and the clamping shafts 80 are urged in the clamping recess 113 of the rotation shaft 11 at the position as shown in FIG. 4. At this time, the distance between the clamping shafts 80 is slightly shorter, thereby exactly clamping the tool head 20. When the tool head 20 is rotated by the rotation shaft 1, the tool head exerts an opposite resistive force on the clamping shafts 80, so that each of the clamping shafts 80 is respectively moved toward the shallower position of the clamping recess 113, thereby providing a greater clamping force on the tool head 20.

Figure 5:
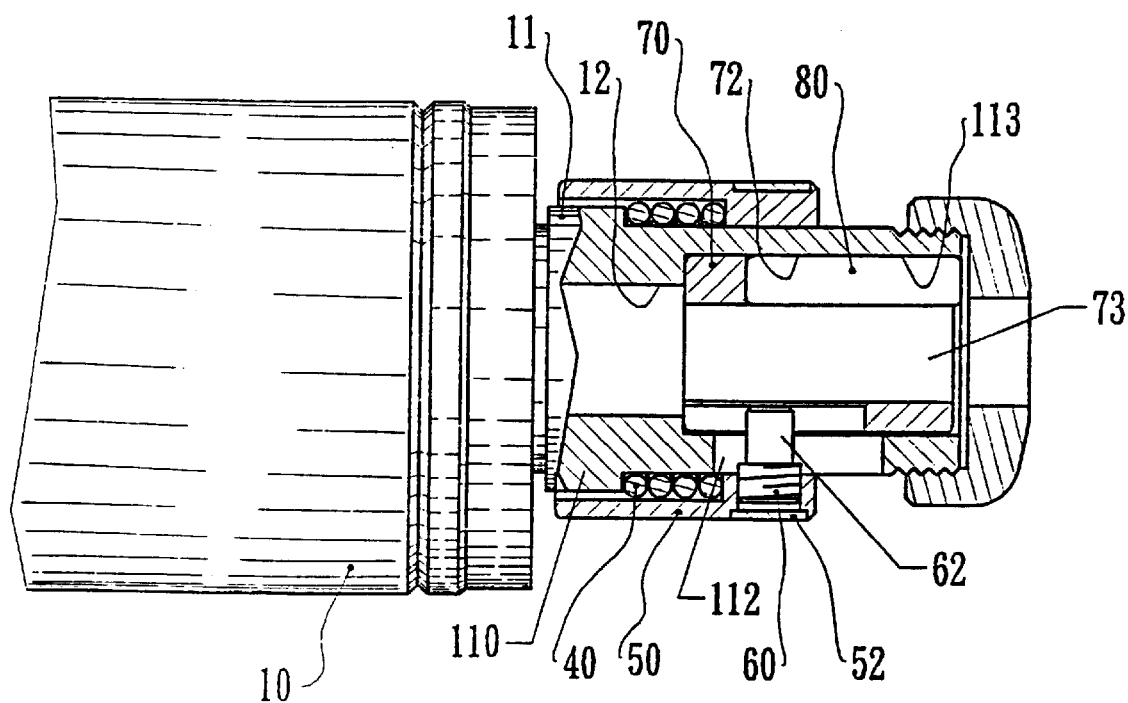
FIG. 5 is a schematic operational view of the tool structure for clamping a tool head quickly as shown in FIG. 3.
Figure 6:
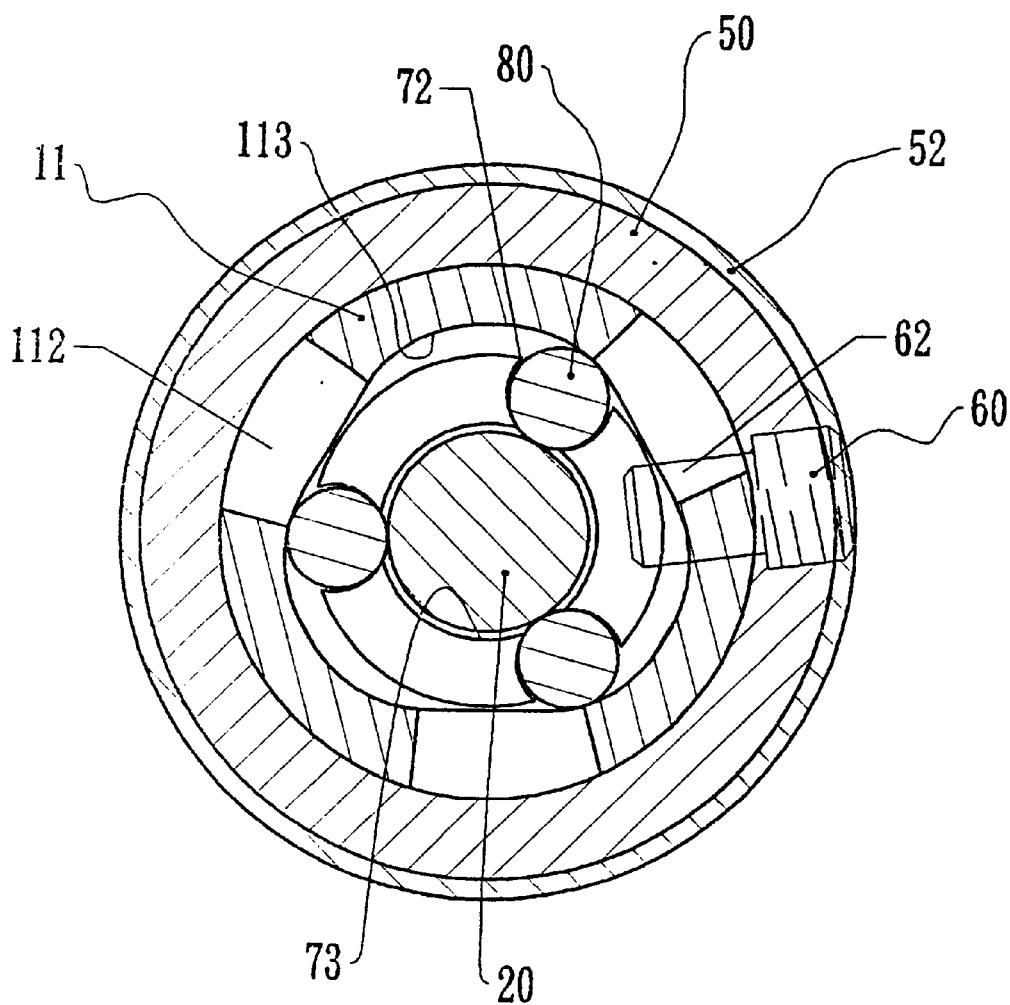
FIG. 6 is a schematic operational view of the tool structure for clamping a tool head quickly as shown in FIG. 4.
Figure 7:
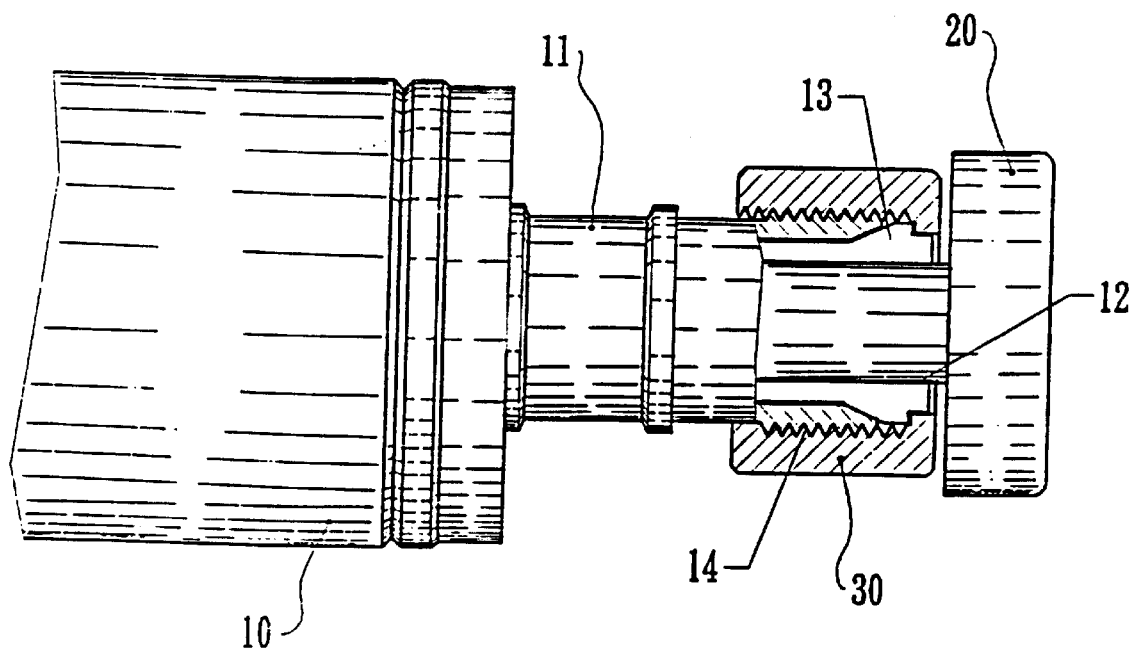
FIG. 7 is a side plan cross-sectional view of a conventional tool structure in accordance with the prior art.

The drive member 50 may be moved toward the annular flange 110 of the rotation shaft 11, thereby compressing the elastic member 40 to the position as shown in FIGS. 5 and 6. At the same time, the shaft seat 70 and the clamping shafts 80 are moved from the position as shown in FIG. 4 to the position as shown in FIG. 6, so that the relative position of the rotation shaft 11 and the shaft seat 70 may be changed. Thus, each of the clamping shafts 80 is respectively moved toward the deeper position of the clamping recess 113, thereby releasing the clamping force on the tool head 20, so that the tool head 20 may be easily removed from the central hole 73 of the shaft seat 70 for replacement. The drive member 50 may then be released after replacement of the tool head 20, and may be returned to its original position by the restoring force of the elastic member 40.

Accordingly, the tool structure for clamping a tool head quickly in accordance with the present invention has the following advantages.

1. The tool head 20 may be mounted on and removed from the shaft seat 70 of the tool structure rapidly and conveniently by moving the drive member 50 directly without having to use an additional tool, thereby greatly enhancing the versatility and convenience of the tool structure.

2. When the tool head 20 is rotated by the rotation shaft 11, the tool head 20 may be fixed rigidly and stably by the relative urging effect between the clamping recess 113 and the clamping shafts 80 during rotation of the rotation shaft 11.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A tool structure for clamping a tool head quickly, comprising: a tool having a rotation shaft having a center formed with a central hole so that a distal end of a tool head may be inserted into the central hole, wherein:

the rotation shaft has a top provided with a cover, and has an outer wall mounted with an elastic member and a drive member, and the drive member is urged by the elastic member, a drive shaft is fixed in the drive member and in turn extended through the rotation shaft and a shaft seat, the rotation shaft is provided with a first guide slot for passage of the drive shaft, and the shaft seat is provided with a second guide slot for passage of the drive shaft, the second guide slot has a slope different from that of the first guide slot, such that the rotation shaft and the shaft seat have different opposite positions when the drive member and the drive shaft are operated, multiple clamping shafts are mounted in the shaft seat to mate with a clamping recess formed in the rotation shaft.

2. The tool structure for clamping a tool head quickly in accordance with claim 1, wherein the rotation shaft has a top end provided with an engaging portion formed with an outer thread, the cover is formed with an inner thread screwed on the outer thread of the engaging portion of the rotation shaft, for securing the cover on the rotation shaft, the cover has a center formed with a through hole for passage of the tool head.

3. The tool structure for clamping a tool head quickly in accordance with claim 1, wherein the elastic member is mounted between the rotation shaft and the drive member, and has a first end urged on an annular flange that is formed on and protruded outward from the outer wall of the rotation shaft, and a second end urged on the inner wall of the drive member, so that the drive member may be forced toward the cover.

4. The tool structure for clamping a tool head quickly in accordance with claim 1, wherein the drive member is formed with a fixing hole having an inner thread, the drive shaft is formed with a fixing portion having an outer thread screwed into the fixing hole of the drive member, the drive shaft is formed with a smooth guide portion having an outer diameter slightly smaller than that of the fixing portion, the guide portion is in turn extended through the rotation shaft and the shaft seat, and a wall of the rotation shaft is formed with an oblique guide slot, and the shaft seat is formed with a straight guide slot aligned with the oblique guide slot, whereby when the drive member drives the drive shaft to move upward and downward, the guide portion of the drive shaft may slide in the oblique guide slot and the straight guide slot, so that a relative position of the rotation shaft and the shaft seat may be changed.

5. The tool structure for clamping a tool head quickly in accordance with claim 1, further comprising a seal ring mounted on an outer wall of the drive member for sealing and limiting the drive shaft.

6. The tool structure for clamping a tool head quickly in accordance with claim 1, wherein the shaft seat is provided with multiple recessed positioning portions for receiving multiple cylindrical clamping shafts, the rotation shaft is formed with a semi-arcuate clamping recess to mate with the clamping shafts, whereby when the relative position of the rotation shaft and the shaft seat is changed, each of the clamping shafts may be respectively moved to a shallower position or a deeper position of the clamping recess, thereby clamping or loosening the tool head in the clamping shafts.

7. The tool structure for clamping a tool head quickly in accordance with claim 1, wherein the shaft seat has a center provided with a central hole for passage of the tool head.

* * * * *